H. H. HUNTER.
AUTOMATIC MAIL RECEIVING AND DELIVERING APPARATUS.
APPLICATION FILED OCT. 1, 1908.
922,701.
Patented May 25, 1909.
5 SHEETS—SHEET 1.
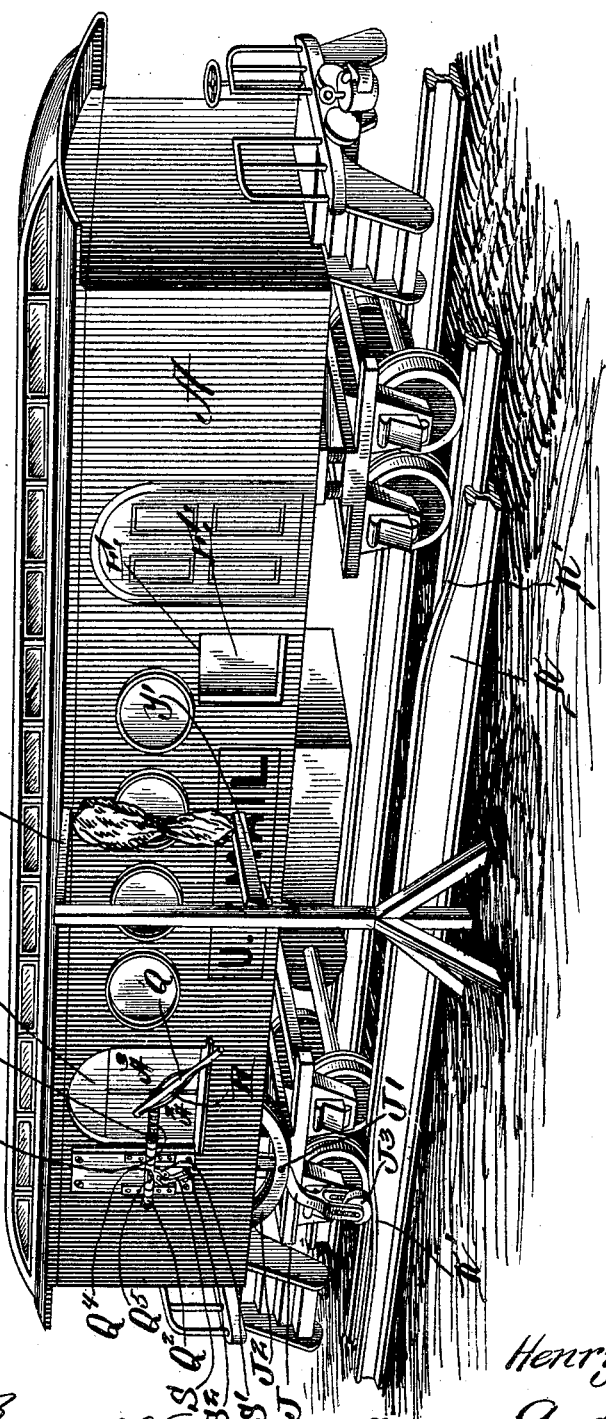

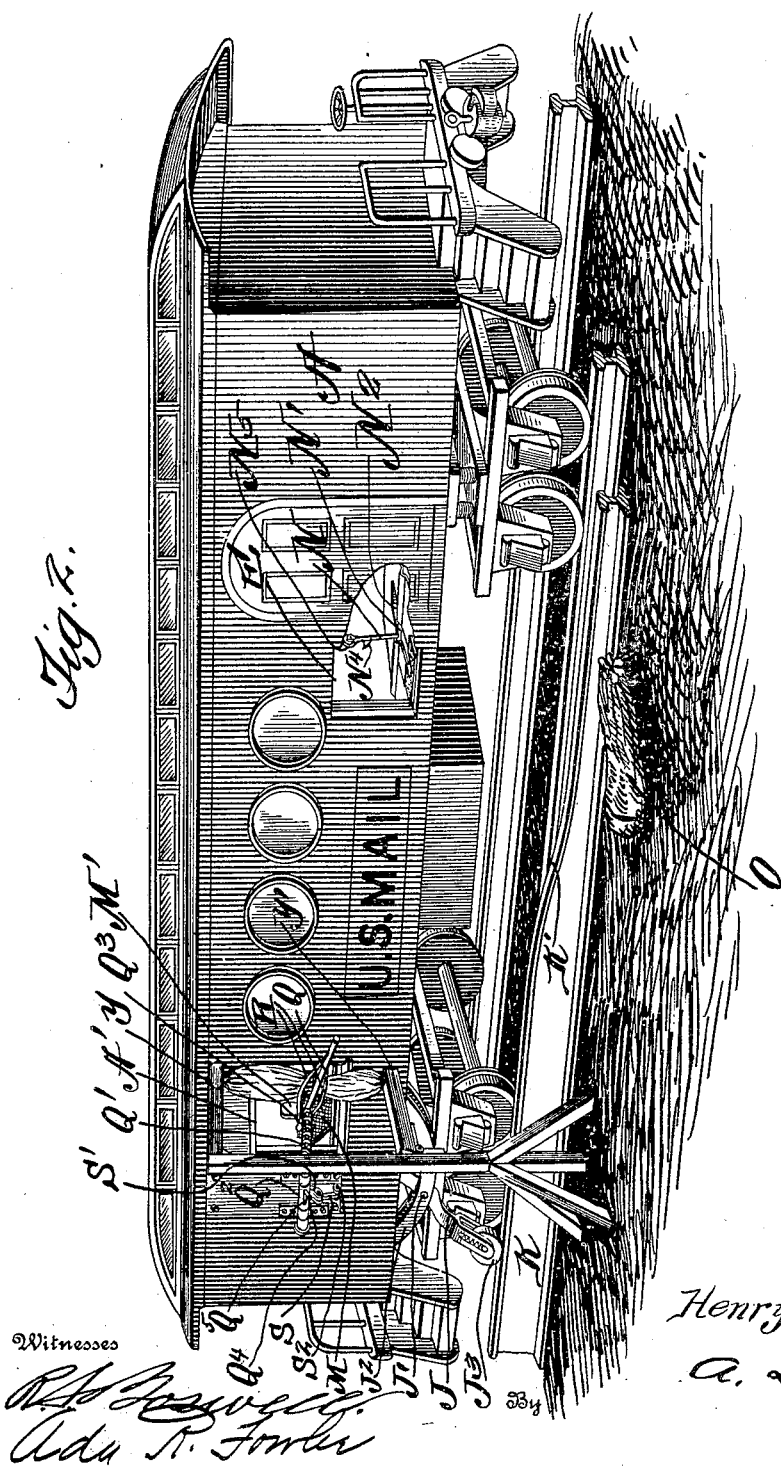

H. H. HUNTER.
AUTOMATIC MAIL RECEIVING AND DELIVERING APPARATUS.
APPLICATION FILED OCT. 1, 1908.
922,701.
Patented May 25, 1909.
5 SHEETS—SHEET 3.
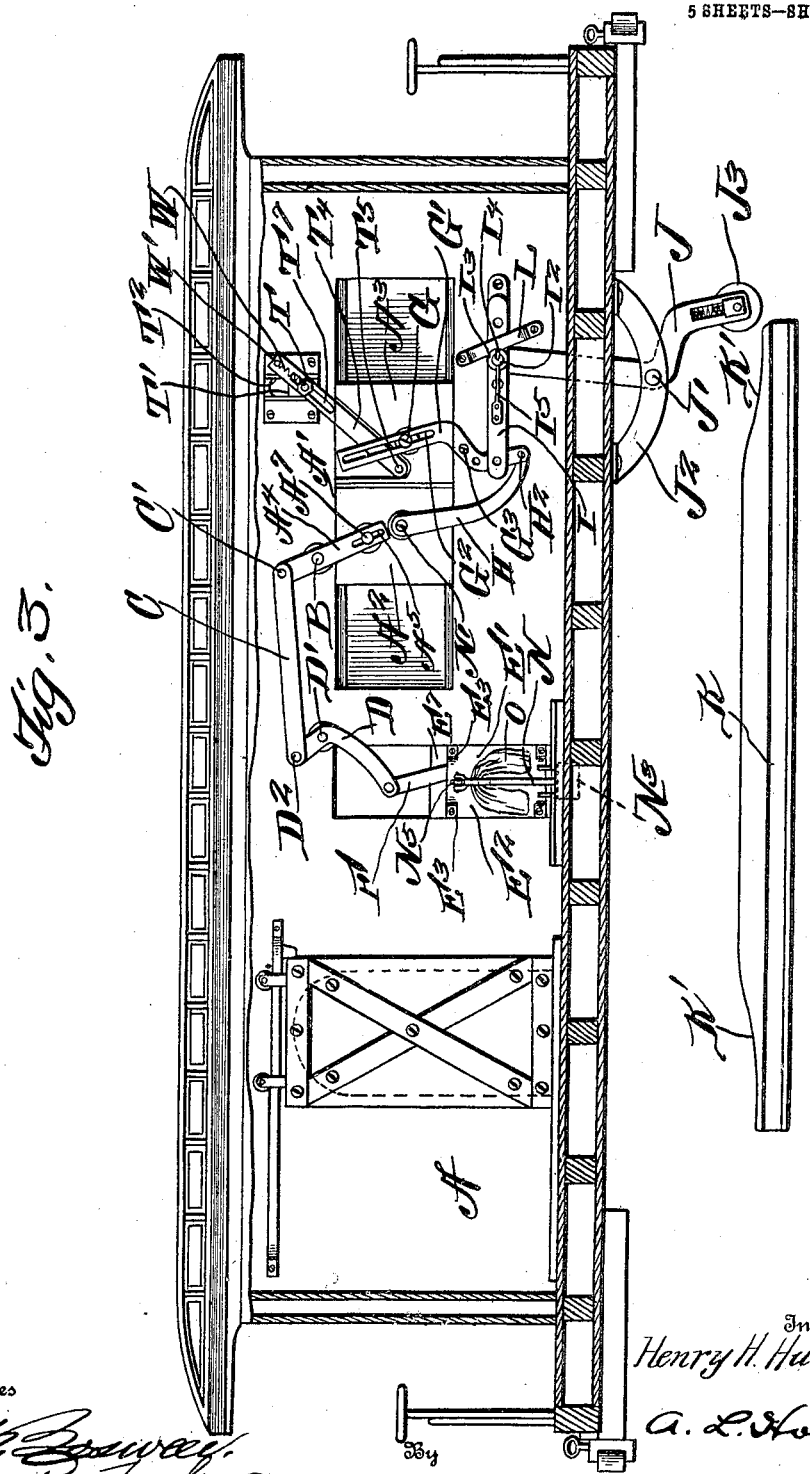

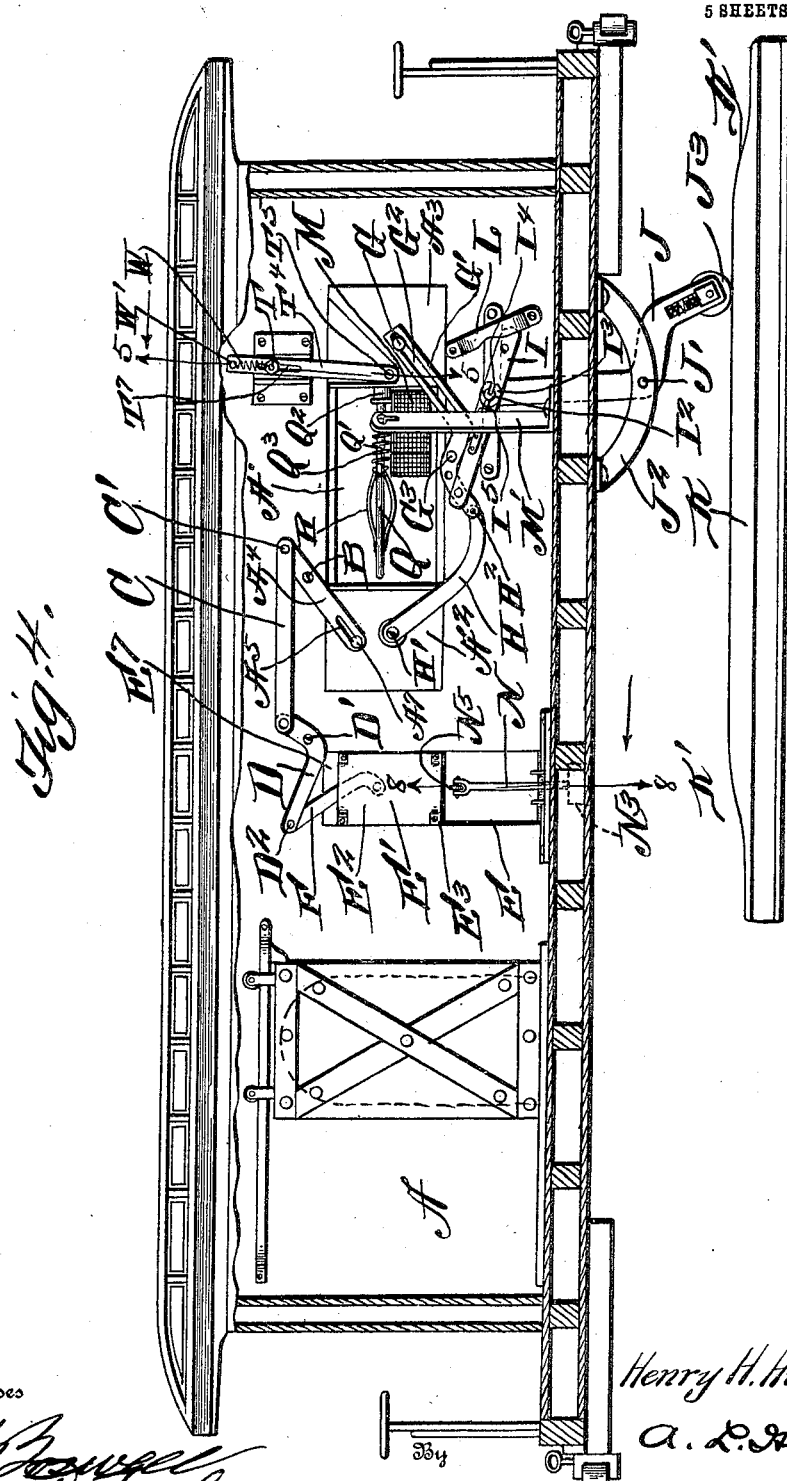

H. H. HUNTER.
AUTOMATIC MAIL RECEIVING AND DELIVERING APPARATUS.
APPLICATION FILED OCT. 1, 1908.
922,701.
Patented May 25, 1909.
5 SHEETS—SHEET 5.
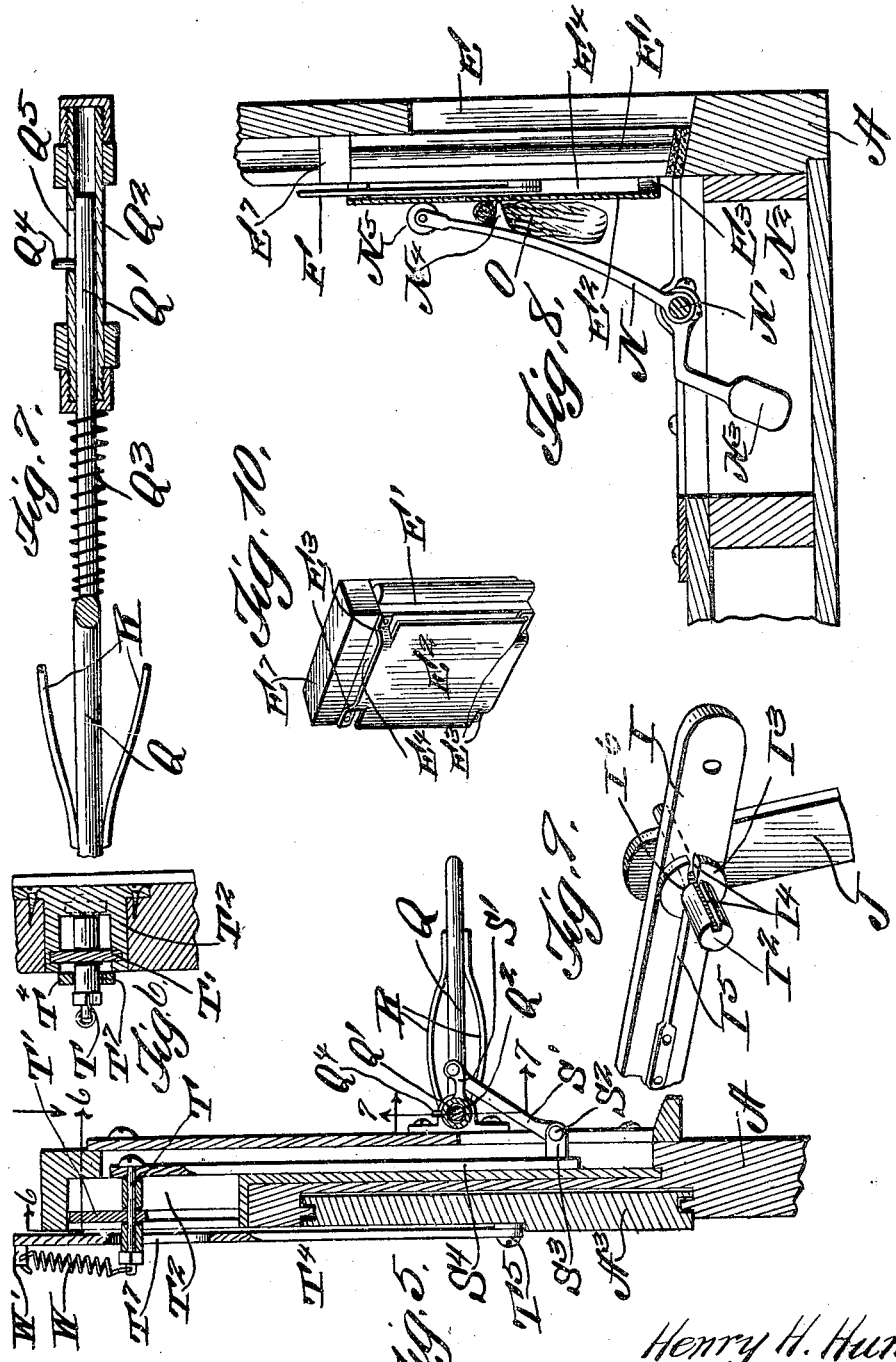
Witnesses
Inventor
Henry H. Hunter,
By A. L. Hough
Attorney

UNITED STATES PATENT OFFICE.

HENRY H. HUNTER, OF BERKELEY SPRINGS, WEST VIRGINIA, ASSIGNOR OF ONE-HALF TO RICHARD E. BERRY AND DALLAS BERRY, OF ASHGROVE, VIRGINIA.

AUTOMATIC MAIL RECEIVING AND DELIVERING APPARATUS.

No. 922,701.    Specification of Letters Patent.    Patented May 25, 1909.

Application filed October 1, 1908. Serial No. 455,597.

*To all whom it may concern:*

Be it known that I, HENRY H. HUNTER, a citizen of the United States, residing at Berkeley Springs, in the county of Morgan and State of West Virginia, have invented certain new and useful Improvements in Automatic Mail Receiving and Delivering Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in mail catching and delivering apparatus for railway mail service, the object in view being to produce an apparatus of this nature which will be entirely automatic in its action and comprises mechanism whereby the doors of a mail car may be opened for the delivery of mail and for the reception of mail matter and actuated entirely independent of the occupant of the car.

The invention comprises various details of construction, combinations and arrangements of parts which will be hereinafter fully described and then specifically defined in the appended claims.

I illustrate my invention in the accompanying drawings, in which:—

Figure 1 is a perspective view of a car showing the apparatus immediately before being operated to receive and deliver mail. Fig. 2 is a similar view showing the mechanism actuated and about to receive a bag of mail and showing also a bag thrown from the car. Fig. 3 is a sectional view longitudinally through a car showing the various parts of my mechanism in elevation and in readiness to be actuated for receiving and delivering mail. Fig. 4 is a similar view showing the relative positions of the parts when thrown into operative relation. Fig. 5 is a sectional view taken on line 5—5 of Fig. 4 and looking in the direction of the arrow. Fig. 6 is a sectional view on line 6—6 of Fig. 5. Fig. 7 is a sectional view on line 7—7 of Fig. 5. Fig. 8 is a sectional view on line 8—8 of Fig. 4. Fig. 9 is an enlarged detail view showing a pivotal pin and lock therefor, and Fig. 10 is an enlarged detail view of one of the sliding doors over the delivery opening of the car.

Reference now being had to the details of the drawings by letter, A designates a mail car having a door opening $A'$ through which mail is adapted to be received into the car while the latter is traveling rapidly. Sliding doors $A^2$ and $A^3$ are mounted in said opening to close the same and designed to slide back and forth upon suitable guideways and, if preferred, ball bearings may be employed to reduce the amount of friction to minimum. Projecting from said door $A^2$ is a pivotal pin $A^7$ to which a lever $A^4$ through which a slot $A^5$ therein has a sliding pivotal connection. The lever $A^4$ is mounted upon a pivotal pin B projecting from the wall of the car, and C designates a bar which is pivotally connected by means of a pivot $C'$ to the upper end of the lever $A^4$. An angled lever D mounted upon a pivot $D'$ is pivotally connected by means of a pin $D^2$ with the other end of the bar C. A second door opening, designated by letter E, is formed at any suitable location in the side wall of the car and in which a vertical sliding door $E'$ is mounted in suitable guideways, and fastened to the rear face of the door $E'$ is a guard plate $E^2$, an enlarged detail view of which is shown in Fig. 10 of the drawings. Said guard plate has lugs $E^3$ struck up from the corners thereof and fastened to the door in such a manner that a space $E'$ is left intermediate the inner face of the door and said guard plate to allow the lever F to tilt therein without interference with any object which might come adjacent to the door. Said lever F is pivotally connected to the door at any suitable location, such as near its center, and its upper end is pivotally connected to one end of the angled lever D, as clearly shown in Figs. 3 and 4. In order to assist the door $E'$ in closing by gravity, a weight $E^4$ is attached thereto, preferably upon its upper end, it being understood that the operative parts of my improved mail receiving and delivery apparatus are turned automatically to their normal position by gravity.

The mail delivery apparatus comprises a bar N pivotally mounted upon a rock shaft $N'$ which is journaled in suitable bearings in the walls of a recess $N^2$ formed in the bottom of the car and a counter-balanced weight $N^3$ is fastened to the end of the bar N for the purpose of returning the latter to its normal position after having been tilted by the weight of a mail bag in delivering the same. In Fig. 8 of the drawings, I have shown a mail bag, designated by letter O, mounted upon a hook or projection of any kind designated by letter $N^4$. An anti-friction wheel $N^5$ is journaled near the upper end of the bar N and bears frictionally against said guard plate $E^2$. The second of said doors, which is designated by letter $A^3$ and which is similar in construction to the door $A^2$, has a pivot G projecting therefrom, and G' designates a curved or angled lever having an elongated slot $G^2$ affording a sliding pivotal connection with the pivot G, and a bar H is pivotally connected at one end to the pin H', which is fastened to the door $A^2$ and its other end is pivotally connected by means of a pin $H^2$ with the lower end of the lever G', which latter also has pivotal connection with a pin $G^3$ upon the wall of the car immediately below the lower edge of the door $A^3$. It will be noted that said lever G' is provided with a plurality of apertures whereby a bar I may have pivotal connection therewith.

A third rail, designated by letter K, is adapted to be fastened parallel with the track rails and along one side thereof, said third rail having tapering portion K' near each end, and J designates an angled lever which is mounted upon a pin J' carried by the bars $J^2$ which are fastened to the bottom of the car. The lower end of the lever J has pivotally connected thereto a wheel $J^3$ which is normally positioned in the path of said third rail and affording means whereby, as a car equipped with the apparatus passes over the third rail, said lever J will be tilted upon its pivot by the wheel $J^3$ coming in contact with the upper edge of said third rail. The upper end of the lever J is adapted to be adjustably connected to the bar I in one or another of the apertures I' by means of the pin $I^2$, an enlarged detail view of which is shown in Fig. 9 of the drawings. Said pin has a flange $I^3$ with a groove $I^4$ therein, which groove extends through the flange and shank portion of the pin. Said pin also has a circumferential groove $I^6$ in which the end of a spring finger $I^5$ is adapted to engage to hold the pin in place. The end of the finger $I^5$ passes through the groove in the flange and, as the point of said finger comes into the annular groove, the pin may be given a partial rotary movement which will hold the end of said pin in a locking relation. A suitable strap L is fastened to the wall of the car and serves as a stop against which the flange of said pin is adapted to contact when the operative parts of the apparatus are in the positions shown in Fig. 3.

Mounted upon the outer face of the side of the car is an angled bar or mail receiving arm, designated by letter Q, having a shank portion Q' adapted to telescope within a tubular shell $Q^2$ horizontally disposed and fastened adjacent to the door opening A', and $Q^3$ designates a coiled spring which is mounted upon said shank of the mail receiving bar and bears intermediate the angled portion of the latter and the end of said shell and is provided for the purpose of breaking the impact of the blow which will be imparted to said mail receiving arm in receiving a mail bag while a train is moving rapidly. A pin $Q^4$ projects from the shank portion of said bar Q and extends through a slot $Q^5$ formed longitudinally in the shell $Q^2$ and said pin serves as a means to limit the movement of the shank portion of the bar Q in opposite directions and also to cause the shank portion of the mail receiving bar to rock with the shell in the manner which will be presently described. At positions diametrically opposite upon the free angled end of the bar Q are the bowed projections R which are provided for the purpose of preventing the mail bag being received into the car from winding about the bar the moment it strikes the latter when being received from the derrick or other station upon which the mail bag has been previously positioned to be delivered to the moving car. Said projections R have a tendency to cause the mail bag to straighten out as it moves against said bar toward the car opening instead of winding about the bar as under the influence of the impact coming against the bag. These projections insure the bag being thrown by the momentum into the interior of the car where a suitable receptacle M mounted upon the standard M' may be provided for receiving the same. The shank portion of the mail receiving bar Q is rocked automatically by means of a link S pivotally connected at one end to an arm S' which is integral with said shell $Q^2$ while its other end is pivotally connected to a pin $S^2$ mounted upon a hook $S^3$ which projects from the lower end of the bar $S^4$. The upper end of said bar $S^4$ is pivotally connected to a pin T which passes through a guide plate T' mounted in suitable grooves in the guide block $T^2$, a detail of which is shown in Fig. 6 of the drawings. A bar $T^4$ is pivotally connected at its inner end to a pivot $T^5$ projecting from the door $A^3$ and its upper end has a sliding pivotal connection with the end of the pin T, the latter mounted in a slot $T^5$ in the lever bar $T^4$. A coiled spring W is fastened at one end to the pin T and its other end secured to a pin W' which projects from the bar $T^4$ near its upper end, the purpose of which spring W is to hold the mail receiving bar yieldingly so that the angled portion thereof will be held yieldingly in a horizontal position in readiness to receive the mail bag.

The mail to be delivered to a car is adapted to be held upon the usual derrick, as shown in Figs. 1 and 2 of the drawings, in which the bag is held by the projecting arms Y and Y' so that the bag will be in the path of the receiving bar Q when the latter is thrown out into the position shown in Fig. 2 of the drawings.

The operation of my apparatus will be readily understood and is as follows:—When a car equipped with my improved apparatus for receiving and delivering mail passes over a third rail, the wheel J³ on the lever J coming in contact with the upper surface of said third rail, which latter is preferably inclined or curved as shown, will cause the lever J to tilt which in turn will communicate motion to the levers G' and A⁴, causing the two doors A² and A³ to be thrown open and in which relation it would assume the position shown in Fig. 4 of the drawings. The moment the doors swing open, the mail receiving bar or arm Q, through the medium of the connecting mechanism with the slotted bar T⁴, will be thrown into the position shown in Fig. 2 of the drawings, in which position its outer angled portion will be in a horizontal plane. Simultaneously with these movements, the door E' will be raised by the lever and bar connections with the door A², causing the mechanism to assume the position shown in Fig. 4 of the drawings. The mail bag O, which has been previously mounted upon the hook N⁴ of the bar N, will hold the latter so that the anti-friction wheel N⁵ will bear against the face of the guard plate E² and, when the guard plate and the door to which it is fastened are raised to the position shown in Fig. 4, the bar N with the mail bag mounted thereon will tilt upon its pivot N' as the weight of the bag will overcome the counterbalance N³, thus causing the mail bag to fall through the door opening and may be received into a receptacle or fall directly upon the ground. Owing to the fact that my improved apparatus may be regulated to operate at a precise moment and that being at the time the car passes over the third rail, a suitable receptacle mounted upon the ground at a certain location may be provided for receiving the mail bag as it is thrown from the car, thus preventing the bag being drawn by suction underneath the car or lost in grass or weeds which occurs frequently where mail bags are now delivered from a car. The mail bag to be taken from the car and which has been previously hooked upon the derrick will be taken up as it comes against the angled end of the receiving bar or arm, the impact of the bag being taken up by the coiled spring upon the shank portion of said receiving arm. As the bag strikes the angled portion of said receiving bar or arm, the bowed portions upon said arm will have a tendency to cause the bag to straighten out rather than to wind about the arm as would be the case were it not for said projections. It will thus be noted that the bag will be delivered without being folded into the car and may be caught in any receptacle provided therein. The moment the car passes over the third rail, the weight of the wheel J³ and also of weighted door E' will cause a reverse motion to be imparted to the lever mechanism, closing the doors and returning the operative parts to their normal positions. As the door is closed, the mail receiving bar is swung down to the position shown in Fig. 1 of the drawings.

It will thus be noted that, by the provision of an apparatus as shown and described, a simple and efficient mechanism is afforded whereby mail may be automatically received by a car moving at any rate of speed and mail delivered, the doors of the car being automatically opened as well as closed before and after receiving and delivering the mail. By the provision of an apparatus of this nature, mail may be delivered without the mail clerks standing at the doors at all hours of the day and night for the purpose of watching stations where it is desired to receive and deliver which is commonly the practice at present and which requires the constant service of an operator for this purpose.

What I claim to be new is:—

1. An automatic apparatus for receiving and delivering mail comprising a car, sliding doors adapted to close openings therein, a third rail, a pivotal lever mounted upon the car and adapted to be tilted by said third rail, mechanism connecting said lever and doors for opening the same, said doors being held open by and during the contact of the lever with said rails, a mail receiving arm, and means for throwing the same into an operative position as said door is opened, as set forth.

2. An automatic apparatus for receiving and delivering mail comprising a car, sliding doors adapted to close openings therein, a third rail, a pivotal lever mounted upon the car and adapted to be tilted by said third rail, mechanism connecting said lever and doors for opening the same, said doors being held open by and during the contact of the lever with said rails, a mail receiving arm, means for throwing the same into an operative position as said door is opened, and means for delivering a mail bag as one of said doors opens, as set forth.

3. An automatic apparatus for receiving and delivering mail comprising a car, sliding doors adapted to close openings therein, a pivotal lever mounted upon the car and adapted to be tilted by a third rail, mechanism connecting said lever and doors for opening the same, a mail receiving arm, means for throwing the same into an operative position as said door is opened, and a counterbalance mail delivery device actuated as one of said doors opens, as set forth.

4. An automatic apparatus for receiving and delivering mail comprising a car, sliding doors adapted to close openings therein, a pivotal lever mounted upon the car and adapted to be tilted by a third rail, mechanism connecting said lever and doors for opening the same, a mail receiving arm, means for throwing the same into an operative position as said door is opened, and a counterbalance mail delivery device engaging one of said doors and designed to deliver the bag as the door is raised, as set forth.

5. An automatic apparatus for receiving and delivering mail comprising a car, sliding doors adapted to close openings therein, a pivotal lever mounted upon the car and adapted to be tilted by a third rail, means connecting said lever and doors for opening the latter, an angled mail receiving member mounted upon the side wall of the car, and pivotal lever and bar connections intermediate the same and one of said doors whereby, as the latter are opened, said mail receiving member may be thrown into a receiving position, as set forth.

6. An automatic apparatus for receiving and delivering mail comprising a car, sliding doors adapted to close openings therein, a pivotal lever mounted upon the car and adapted to be tilted by a third rail, means connecting said lever and doors for opening the latter, an angled mail receiving member mounted upon the side wall of the car, pivotal lever and bar connections intermediate the same and one of said doors whereby, as the latter are opened, said mail receiving member may be thrown into a receiving position, and means upon the latter for preventing a mail bag winding about the same, as set forth.

7. An automatic apparatus for receiving and delivering mail comprising a car, sliding doors adapted to close openings therein, a pivotal lever mounted upon the car and adapted to be tilted by a third rail, means connecting said lever and doors for opening the latter, an angled mail receiving member mounted upon the side wall of the car, pivotal lever and bar connections intermediate the same and one of said doors whereby, as the latter are opened, said mail receiving member may be thrown into a receiving position, and bowed projections upon the mail receiving arm for preventing a mail bag winding about the latter, as set forth.

8. An automatic apparatus for receiving and delivering mail comprising a car, sliding doors adapted to close openings therein, a pivotal lever mounted upon the car and adapted to be tilted by a third rail, means connecting said lever and doors for opening the latter, a yielding angled mail receiving member, a rocking shell in which the shank portion of said member telescopes, and means connecting said shell with a door whereby said shell and receiving member may be rocked as the door is opened, as set forth.

9. An automatic apparatus for receiving and delivering mail comprising a car, sliding doors adapted to close openings therein, a pivotal lever mounted upon the car and adapted to be tilted by a third rail, means connecting said lever and doors for opening the latter, a yielding angled mail receiving member, a rocking shell in which the shank portion of said member telescopes, a pin projecting from the shank portion of the mail receiving arm and extending through a slot in said shell, and connections intermediate the latter and one of said doors whereby the mail receiving member may be thrown into a receiving position as the door is opened, as set forth.

10. An automatic apparatus for receiving and delivering mail comprising a car, sliding doors adapted to close openings therein, a pivotal lever mounted upon the car and adapted to be tilted by a third rail, means connecting said lever and doors for opening the latter, a yielding angled mail receiving member, a rocking shell in which the shank portion of said member telescopes, a pin projecting from the shank portion of the mail receiving arm and extending through a slot in said shell, an arm projecting from said shell, a link connected to said arm, and connections between said link and door whereby, as the latter is opened, said mail receiving arm may be thrown to a receiving position, as set forth.

11. An automatic apparatus for receiving and delivering mail comprising a car, sliding doors adapted to close openings therein, a pivotal lever mounted upon the car and adapted to be tilted by a third rail, means connecting said lever and doors for opening the latter, a yielding angled mail receiving member, a rocking shell in which the shank portion of said member telescopes, a pin projecting from the shank portion of the mail receiving arm and extending through a slot in said shell, an arm projecting from said shell, a link connected to said arm, a sliding plate and guideway in which the same is mounted, pivotal connections between said plate and link, and a bar pivotally connecting said plate and door, as set forth.

12. An automatic apparatus for receiving and delivering mail comprising a car, sliding doors adapted to close openings therein, a pivotal lever mounted upon the car and adapted to be tilted by a third rail, means connecting said lever and doors for opening the latter, a yielding angled mail receiving member, a rocking shell in which the shank portion of said member telescopes, a pin projecting from the shank portion of the mail receiving arm and extending through a slot in said shell, an arm projecting from said shell, a link connected to said arm, a sliding plate and guideway in which the same is mounted, pivotal connections between said plate and link, a bar pivoted at one end to one of said plates, a pin projecting from said plate and having a play in a longitudinal slot in said bar, a spring fastened at one end to said pivotal pin and its other end to said slotted bar, as set forth.

13. A mail receiving and delivery apparatus for railway mail service comprising, in combination with a car, horizontally and vertically sliding doors for regulating openings in the side of the car, a tilting lever mounted upon the car and adapted to be actuated by a third rail positioned in the path of one end of said lever, pivotal lever connections between said doors and lever actuated by the third rail, bar and lever connections between one of said horizontally sliding doors and the vertically movable doors, a weight upon said vertically movable door, a counter-balanced mail delivery member adapted to bear against said vertically movable door and to tilt as the latter is raised, a rocking mail receiving member, and mechanism intermediate the same and one of said horizontally disposed doors, as set forth.

14. A mail receiving and delivery apparatus for railway mail service comprising, in combination with a car, horizontally and vertically sliding doors for regulating openings in the side of the car, a tilting lever mounted upon the car and adapted to be actuated by a third rail positioned in the path of one end of said lever, a bar adjustably connected to said tilting lever, a lever pivoted upon the car and having a fixed pivotal connection with one of the horizontally sliding doors and a sliding pivotal connection with the other, a mail delivery device actuated as the vertically movable door is opened, and a mail receiving member which is thrown into receiving position as the horizontally disposed doors are opened, as set forth.

In testimony whereof I hereunto affix my signature in presence of two witnesses

H. H. HUNTER.

Witnesses:
H. W. DISHER,
JOHN O. GREENE.